United States Patent
Tamaki

(10) Patent No.: US 10,241,544 B2
(45) Date of Patent: Mar. 26, 2019

(54) INFORMATION PROCESSOR

(71) Applicant: SEMICONDUCTOR ENERGY LABORATORY CO., LTD., Atsugi-shi, Kanagawa-ken (JP)

(72) Inventor: Shigeru Tamaki, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 5 days.

(21) Appl. No.: 15/895,609

(22) Filed: Feb. 13, 2018

(65) Prior Publication Data

US 2018/0173278 A1 Jun. 21, 2018

Related U.S. Application Data

(63) Continuation of application No. 14/300,632, filed on Jun. 10, 2014, now Pat. No. 9,927,840.

(30) Foreign Application Priority Data

Jun. 21, 2013 (JP) .................. 2013-130247

(51) Int. Cl.
*G06F 1/16* (2006.01)
*G06F 3/044* (2006.01)
(Continued)

(52) U.S. Cl.
CPC .......... *G06F 1/1652* (2013.01); *G06F 1/1643* (2013.01); *G06F 3/03547* (2013.01);
(Continued)

(58) Field of Classification Search
CPC ........ G06F 1/16; G06F 1/1652; G06F 3/0354; G06F 3/03547; G06F 3/0488; G06F 3/04883; G06F 1/1643; G06F 3/044; G06F 2203/0339; G06F 2200/1637; G06F 2203/04102
See application file for complete search history.

(56) References Cited

U.S. PATENT DOCUMENTS 8,319,725 B2 11/2012 Okamoto et al.
8,543,166 B2 9/2013 Choi et al.
(Continued)

FOREIGN PATENT DOCUMENTS

EP 2202624 A 6/2010
EP 2461237 A 6/2012
(Continued)

*Primary Examiner* — Maurice L. McDowell, Jr.
*Assistant Examiner* — Donna J. Ricks
(74) *Attorney, Agent, or Firm* — Nixon Peabody LLP; Jeffrey L. Costellia

(57) ABSTRACT

A novel information processor that can be easily operated is provided. In addition, a novel information processor that is less likely to be operated incorrectly is provided. The conceived information processor includes an arithmetic device including an arithmetic unit and a storage unit that stores a program to be executed by the arithmetic unit and an input/output device including an input unit that can supply an operation instruction and a bend sensor that can supply bend data. The program makes the arithmetic device execute different types of processing in accordance with the combination of the supplied operation instruction and bend data.

7 Claims, 10 Drawing Sheets

(51) Int. Cl.
  *G06F 3/0488* (2013.01)
  *G06F 3/0354* (2013.01)

(52) U.S. Cl.
  CPC .......... *G06F 3/044* (2013.01); *G06F 3/04883* (2013.01); *G06F 2200/1637* (2013.01); *G06F 2203/0339* (2013.01); *G06F 2203/04102* (2013.01)

(56) References Cited

U.S. PATENT DOCUMENTS

| | | |
|---|---|---|
| 8,547,197 B2 | 10/2013 | Byun et al. |
| 8,581,859 B2 | 11/2013 | Okumura et al. |
| 8,654,095 B1 | 2/2014 | Cho et al. |
| 8,669,955 B2 | 3/2014 | Nishio et al. |
| 2007/0085845 A1 | 4/2007 | Kikuchi et al. |
| 2010/0056223 A1 | 3/2010 | Choi et al. |
| 2010/0064244 A1 | 3/2010 | Kilpatrick, II et al. |
| 2010/0164888 A1* | 7/2010 | Okumura ............. G06F 1/1626 345/173 |
| 2011/0095975 A1 | 4/2011 | Hwang et al. |
| 2011/0111798 A1 | 5/2011 | Jeon et al. |
| 2012/0115422 A1* | 5/2012 | Tziortzis ................... G06F 3/01 455/73 |
| 2012/0127109 A1* | 5/2012 | Nishio ................ G06F 3/04883 345/173 |
| 2012/0217516 A1 | 8/2012 | Hatano et al. |
| 2012/0250241 A1 | 10/2012 | Minemura et al. |
| 2012/0329528 A1 | 12/2012 | Song |
| 2014/0015743 A1* | 1/2014 | Seo ....................... G06F 1/1694 345/156 |
| 2014/0098028 A1 | 4/2014 | Kwak et al. |
| 2014/0320447 A1 | 10/2014 | Kung |
| 2014/0347287 A1 | 11/2014 | Lee et al. |
| 2014/0361980 A1 | 12/2014 | Iwaki et al. |

FOREIGN PATENT DOCUMENTS

| | | |
|---|---|---|
| JP | 09-305259 A | 11/1997 |
| JP | 2007-108441 A | 4/2007 |
| JP | 2010-157060 A | 7/2010 |
| JP | 2011-232843 A | 11/2011 |
| JP | 2012-190794 A | 10/2012 |
| JP | 2012-216169 A | 11/2012 |
| WO | WO-2011/013400 | 2/2011 |

* cited by examiner

INFORMATION PROCESSOR

BACKGROUND OF THE INVENTION

1. Field of the Invention

The present invention relates to an object, a method, or a manufacturing method. In addition, the present invention relates to a process, a machine, manufacture, or a composition of matter. In particular, the present invention relates to, for example, a human interface, a semiconductor device, a display device, a light-emitting device, a power storage device, a driving method thereof, or a manufacturing method thereof. In particular, the present invention relates to, for example, a method and a program for processing and displaying image data, and a device including a recording medium in which the program is recorded. In particular, the present invention relates to, for example, a method for processing and displaying image data by which an image including information processed by an information processor provided with a display portion is displayed, a program for displaying an image including information processed by an information processor provided with a display portion, and an information processor including a recording medium in which the program is recorded.

2. Description of the Related Art

The social infrastructures relating to means for transmitting information have advanced. This has made it possible to acquire, process, and send out many pieces and various kinds of information with the use of an information processor not only at home or office but also at other visiting places.

With this being the situation, portable information processors are under active development.

For example, portable information processors are often used outdoors, and force might be accidentally applied by dropping to the information processors and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

SUMMARY OF THE INVENTION

An operating method using a pointer is convenient because it allows a user to operate an information processor intuitionally. Specifically, gestures (e.g., tap, drag, swipe, and pinch-in) using a finger as a pointer on a touch panel enables intuitional operation.

However, the kinds of gestures are limited. Therefore, operating a multifunctional information processor requires a complicated operation in which some gestures and the sequence of the gestures are combined.

One embodiment of the present invention is made in view of the foregoing technical background. An object of one embodiment of the present invention is to provide a novel information processor that can be easily operated. Another object of one embodiment of the present invention is to provide a novel information processor that is less likely to be operated incorrectly.

Note that the descriptions of these objects do not disturb the existence of other objects. In one embodiment of the present invention, there is no need to achieve all the objects. Other objects will be apparent from and can be derived from the description of the specification, the drawings, the claims, and the like.

The embodiments described below include one embodiment of the present invention which is made with a focus on an arithmetic device that receives an operation instruction and bend data and an input/output device that supplies an operation instruction and bend data.

An information processor of one embodiment of the present invention includes an arithmetic device including an arithmetic unit and a storage unit that stores a program to be executed by the arithmetic unit and an input/output device including and input unit that can supply an operation instruction and a bend sensor that can supply bend data. The program makes the arithmetic device execute different types of processing in accordance with the combination of the supplied operation instruction and bend data.

In the above information processor of one embodiment of the present invention, the input unit can be used in combination with the bend sensor. Thus, for example, the kinds of operation that can be input with a pointer can be increased. Consequently, a novel information processor that can be easily operated can be provided. In addition, a novel information processor that is less likely to be operated incorrectly can be provided.

One embodiment of the present invention is an information processor including: an arithmetic device that receives an operation instruction including a termination instruction and bend data; and an input/output device that supplies the operation instruction and the bend data. The arithmetic device includes an arithmetic unit and a storage unit that stores a program to be executed by the arithmetic unit. The input/output device includes an input unit that supplies the operation instruction and a bend sensor that senses a bend angle and supplies the bend data. The program includes: a first step of performing initialization; a second step of allowing interrupt processing; a third step of executing the interrupt processing and processing information; a fourth step of returning to the third step when the termination instruction has not been input in the interrupt processing and proceeding to a fifth step when the termination instruction has been input in the interrupt processing; and the fifth step of terminating the program. The interrupt processing includes: a sixth step of receiving the termination instruction and the bend data; a seventh step of processing to an eleventh step when the bend data has not been supplied in the sixth step and proceeding to an eighth step when the bend data has been supplied in the sixth step; the eighth step of proceeding to a ninth step when the bend data does not indicate an outward bending and proceeding to a tenth step when the bend data indicates and outward bending; the ninth step of performing first processing; the tenth step of performing second processing that is different from the first processing; and the eleventh step of recovering from the interrupt processing.

The above information processor of one embodiment of the present invention includes the arithmetic device that receives an operation instruction supplied by the input unit and bend data supplied by the bend sensor. The arithmetic device includes the storage unit that stores a program. This structure enables the input unit to be used in combination with the bend sensor and thus can reduce complicated operations in which limited kinds of operations using only the input unit are performed in a sequence. Consequently, a novel information processor that can be easily operated can be provided.

Another embodiment of the present invention is the above information processor. The first processing includes: a twelfth step of receiving a gesture by the input unit; a thirteenth step of proceeding to a seventeenth step when a first gesture or a second gesture has not been recognized in the twelfth step and proceeding to a fourteenth step when the first gesture or the second gesture has been recognized and the operation instruction has been supplied in the twelfth step; the fourteenth step of proceeding to a fifteenth step when the second gesture has not been recognized in the twelfth step and proceeding to a sixteenth step when the second gesture has been recognized in the twelfth step; the fifteenth step of performing first gesture processing; the sixteenth step of performing second gesture processing that is different from the first gesture processing; and the seventeenth step of recovering from the first processing.

Another embodiment of the present invention is the above information processor. The second processing includes: an eighteenth step of receiving a gesture by the input unit; a nineteenth step of proceeding to a twenty-third step when a first gesture or a second gesture has not been recognized in the eighteenth step and proceeding to a twentieth step when the first gesture or the second gesture has been recognized and the operation instruction has been supplied in the eighteenth step; the twentieth step of proceeding to a twenty-first step when the second gesture has not been recognized in the eighteenth step and proceeding to a twenty-second step when the second gesture has been recognized in the eighteenth step; the twenty-first step of performing first gesture processing that is different from the first gesture processing in the first processing; the twenty-second step of performing second gesture processing that is different from the second gesture processing in the first processing; and the twenty-third step of recovering from the second processing.

The above information processor of one embodiment of the present invention performs different types of processing in accordance with the combination of bend data supplied by the bend sensor and an operation instruction supplied by the input unit that has recognized a gesture. This enables the input unit to be used in combination with the bend sensor and thus can reduce complicated operations in which limited kinds of operations using only the input unit are performed in a sequence. Consequently, a novel information processor that can be easily operated can be provided.

Another embodiment of the present invention is the above information processor in which the input unit is a flexible touch sensor and the bend sensor senses an angle at which the input unit is bent.

Another embodiment of the present invention is the above information processor in which the arithmetic device supplies image data, the input/output device includes a bendable display unit that receives the image data, and the bend sensor senses an angle at which the display unit is bent.

Another embodiment of the present invention is any of the above information processors in which the arithmetic device supplies image data, the input/output device includes a bendable display unit that receives the image data, the bend sensor senses an angle at which the display unit is bent, and the input unit is a touch sensor that can be bent together with the display unit.

The above information processor of one embodiment of the present invention includes the bendable display unit and the bend sensor that senses the angle at which the display unit is bent. The information processor performs different types of processing in accordance with the combination of bend data supplied by the bend sensor and an operation instruction supplied by the input unit (e.g., a touch sensor). This enables the input unit to be used in combination with the bend sensor and thus can reduce complicated operations in which limited kinds of operations using only the input unit are performed in a sequence. Consequently, a novel information processor that can be easily operated can be provided.

According to one embodiment of the present invention, a novel information processor that can be easily operated can be provided. In addition, a novel information, processor that is less likely to be operated incorrectly can be provided.

BRIEF DESCRIPTION OF THE DRAWINGS

FIGS. 1A, 1B, 1C1, and 1C2 are a block diagram and schematic views illustrating a structure of an information processor of one embodiment.

FIG. 2 is a flow chart showing a program of one embodiment.

FIGS. 7A, 7B1, 7B2, and 7C each illustrate how an information processor of one embodiment is used.

DETAILED DESCRIPTION OF THE INVENTION

Figure 1A:
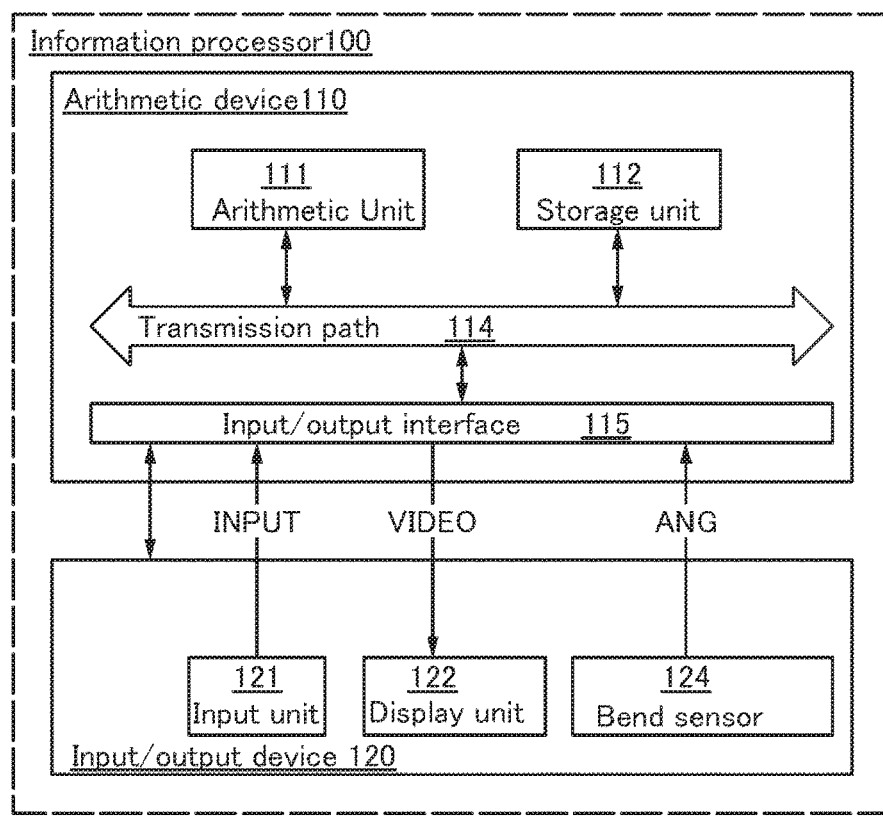

Embodiments will be described in detail with reference to drawings. Note that the present invention is not limited to the description below, and it is easily understood by those skilled in the art that various changes and modifications can be made without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

(Embodiment 1)

In this embodiment, a structure of an information processor of one embodiment of the present invention will be described with reference to FIGS. 1A, 1B, 1C1, and 1C2, FIG. 2, FIG. 3, FIG. 4, and FIG. 5.

FIG. 1A is a block diagram illustrating the structure of an information processor 100 of one embodiment of the present invention.

Figure 1B:
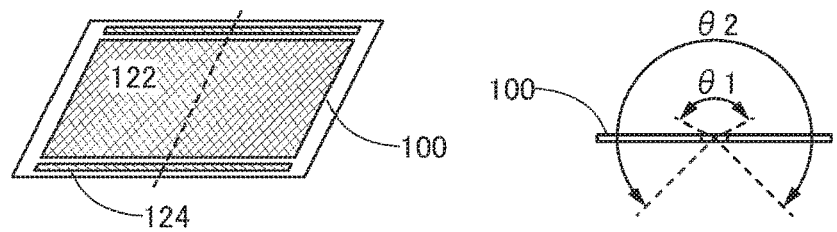

FIG. 1B is a schematic view illustrating the structure of the information processor 100 of one embodiment of the present invention.

Figure 1B:
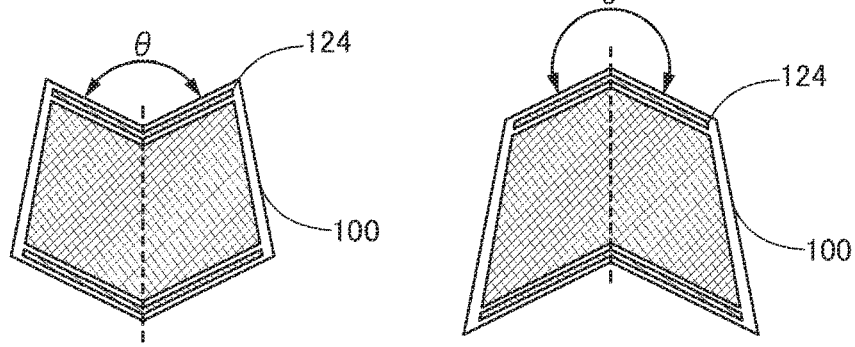
Figure 2:
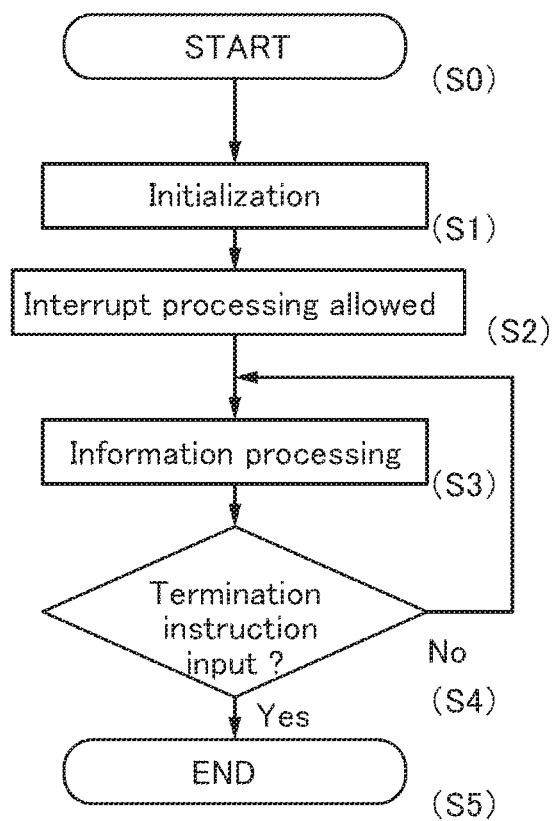

FIG. 1C1 is a schematic view illustrating the information processor 100 in FIG. 1B that is bent inward, and FIG. 1C2 is a schematic view illustrating the information processor 100 in FIG. 1B that is bent outward.

FIG. 2, FIG. 3, FIG. 4, and FIG. 5 are flow charts showing a program to be executed by an arithmetic unit of the information processor 100 of one embodiment of the present invention. Note that FIG. 2 is a flow chart showing the main processing.

Figure 3:
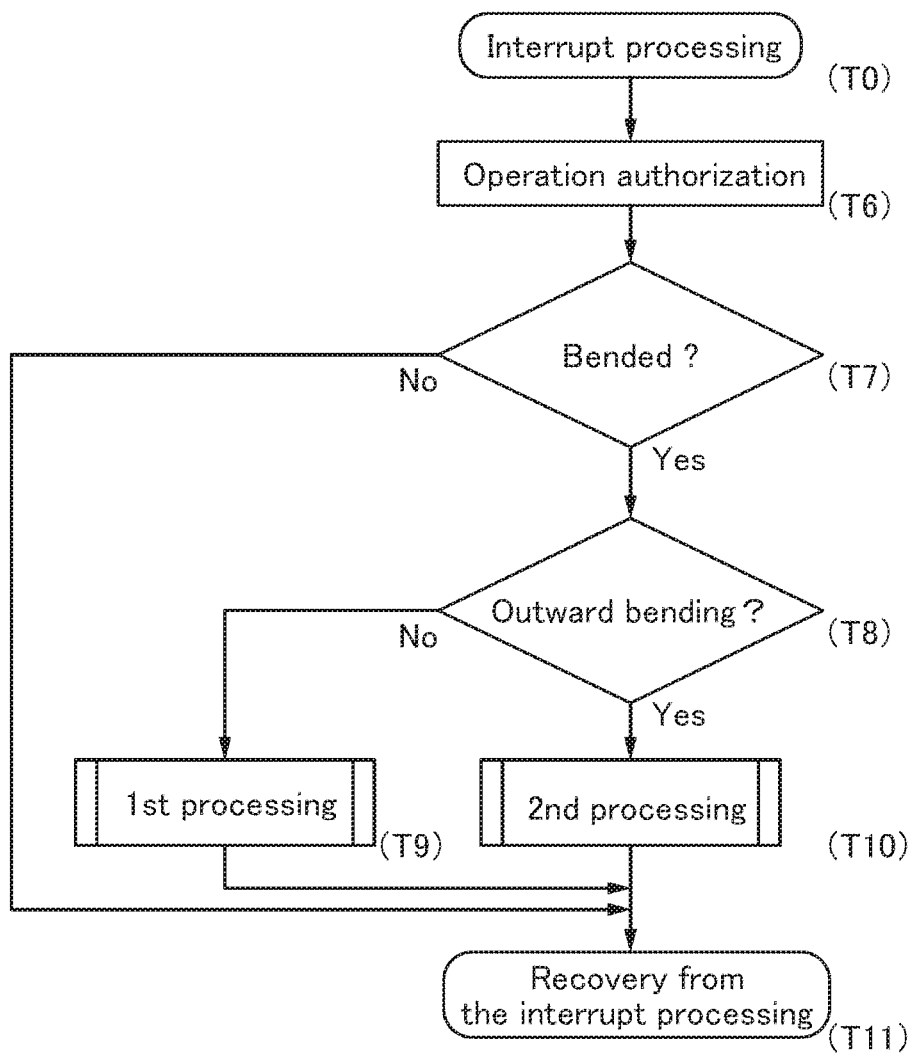
FIG. 3 is a flow chart showing a program of one embodiment.
Figure 4:
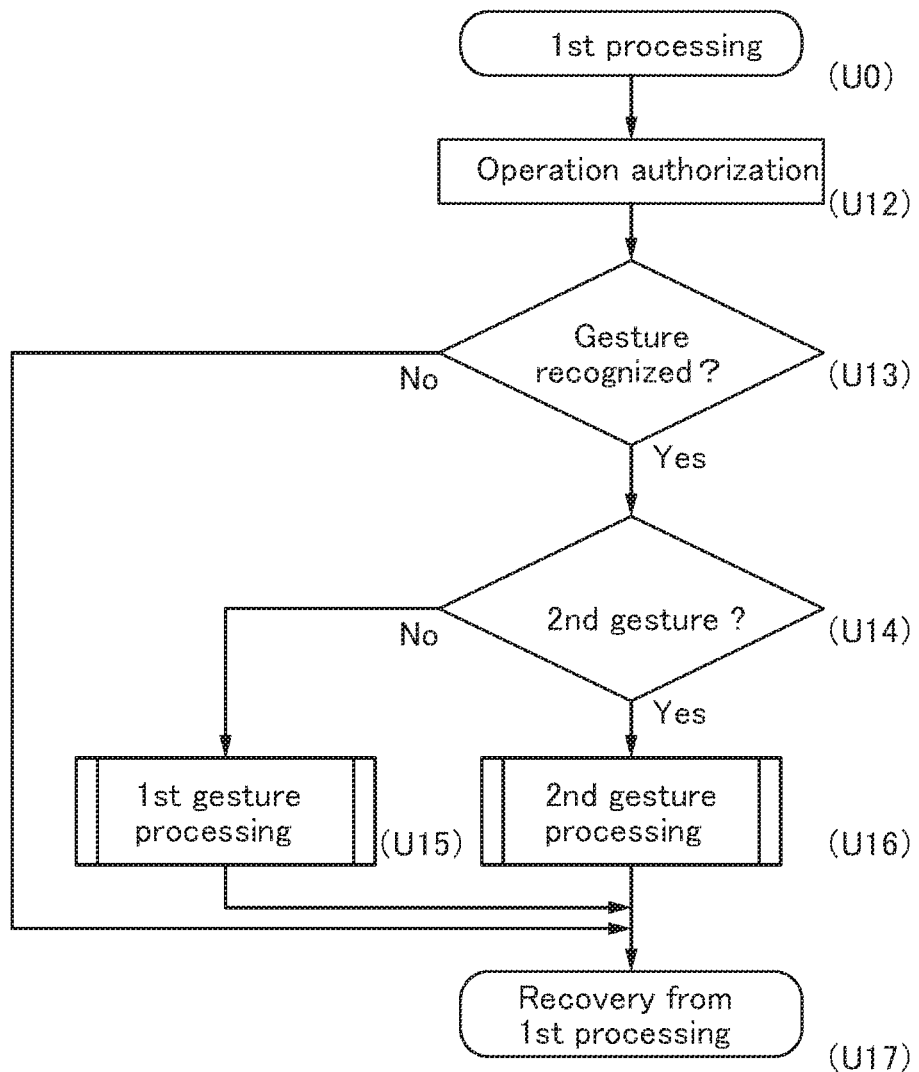
FIG. 4 is a flow chart showing a program of one embodiment.
Figure 5:
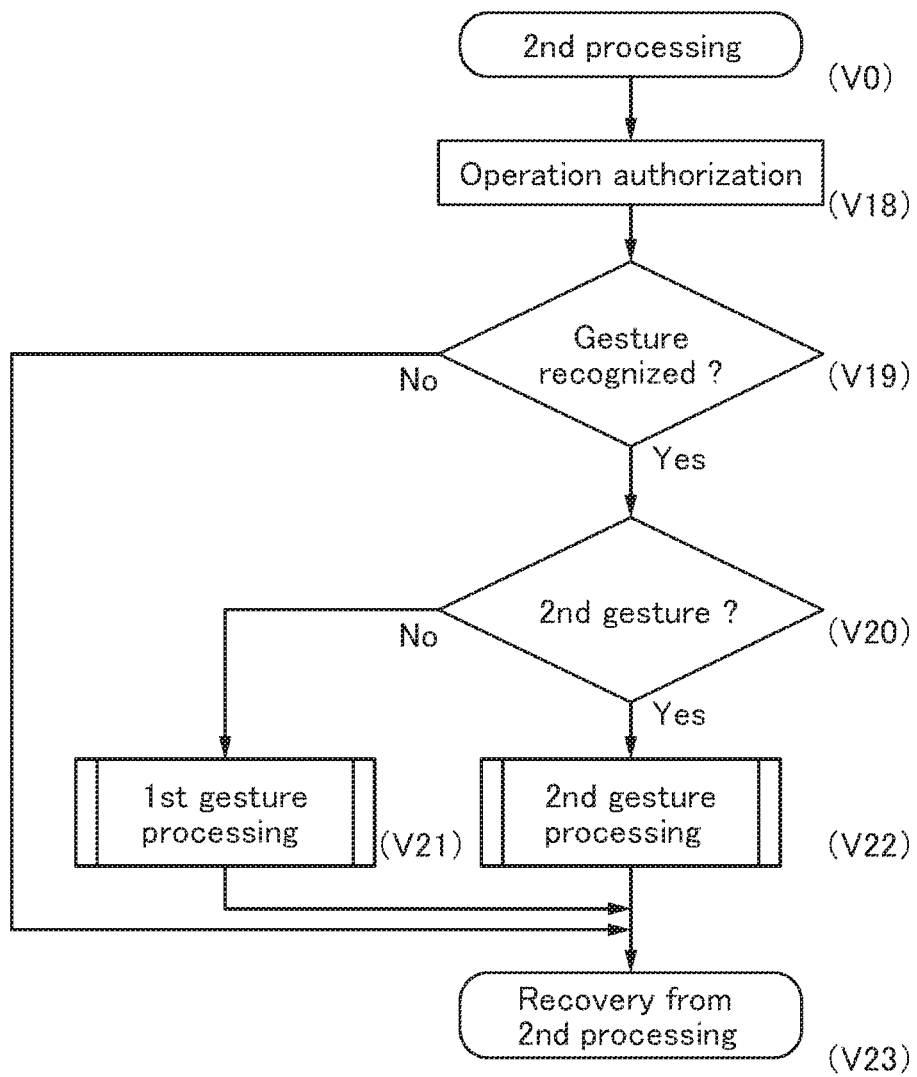
FIG. 5 is a flow chart showing a program of one embodiment.

FIG. 3 is a flow chart showing the interrupt processing in FIG. 2. FIG. 4 and FIG. 5 are flow charts showing the first processing and the second processing, respectively, in FIG. 3.

<Information Processor>

The information processor 100 described in this embodiment includes an arithmetic device 110 that receives an operation instruction INPUT including a termination instruction and the like and bend data ANG and an input/output device 120 that supplies an operation instruction INPUT and bend data ANG (see FIG. 1A).

The arithmetic device 110 includes an arithmetic unit 111 and a storage unit 112 that stores a program to be executed by the arithmetic unit 111.

The input/output device 120 includes an input unit 121 that can supply an operation instruction INPUT and a bend sensor 124 that can sense a bend angle θ and supply bend data ANG. Note that the angle θ can be defined as shown in FIG. 1B, FIG. 1C1, or FIG. 1C2, for example, <<Program>>

The program to be executed by the arithmetic unit 111 includes the following steps (see FIG. 2).

In a first step, a timer or the like is initialized (see (S1) in FIG. 2). Note that this initialization step also includes the operation of reading initial information that is needed for any of the interrupt processing, the first processing, the second processing, and the like, which are described later.

In a second step, the interrupt processing is allowed. When the interrupt processing is allowed, the main processing described using FIG. 2 can be stopped and the interrupt processing described later can be executed (see (S2) in FIG. 2).

In a third step, the initial information or information that has been generated in the interrupt processing allowed in the second step is processed (see (S3) in FIG. 2).

An example of the information processing performed in the third step is to output information stored in the storage unit 112 to the input/output device 120. Specifically, the example of the information processing includes a processing of decompressing compressed image data that is stored in the storage unit 112 and displaying the decompressed data on a display unit 122 and a processing of outputting compressed audio data to a speaker or the like.

In a fourth step, the operation returns to the third step in the case where a termination instruction has not been input in the interrupt processing, and proceeds to a fifth step in the case where a termination instruction has been input in the interrupt processing (see (S4) in FIG. 2).

In the fifth step, the program is terminated (see (S5) in FIG. 2).

The interrupt processing will be described (see FIG. 3). Note that when the interrupt processing is allowed, the arithmetic unit can receive an instruction to execute the interrupt processing. The arithmetic unit that has received the instruction to execute the interrupt processing stops the main processing and executes the interrupt processing. For example, the arithmetic unit that has received an event associated with the instruction executes the interrupt processing and stores the execution result in the storage unit. Then, the arithmetic unit that has recovered from the interrupt processing can resume the main processing on the basis of the execution result of the interrupt processing.

In a sixth step, a termination instruction, bend data ANG, and the like are received. A user of the information processor 100 can input a termination instruction and the like with, for example, the input unit 121 (see (T6) in FIG. 3).

For example, the interrupt processing has a standby period in which a termination instruction is received and bend data ANG is acquired. Specifically, the standby period is provided at timings measured with a timer or the like. A touch sensor can be used as the input unit 121. A user of the information processor 100 can input, in the standby period, a termination instruction by a gesture (e.g., pinch-in) using his/her finger as a pointer on the touch sensor.

In seventh step, the operation proceeds to an eleventh step in the case where bend data ANG has not been supplied in the sixth step, and proceeds to an eighth step in the case where bend data ANG has been supplied in the sixth step (see (T7) in FIG. 3).

For example, when the bend sensor 124 that has been in a bent state is put in a non-bent state and thus supply of bend data ANG is stopped, the operation proceeds to the eleventh step. Conversely, when the bend sensor 124 is put in a bent state and thus bend data ANG is supplied, the operation proceeds to the eighth step.

In the eighth step, the operation proceeds to a ninth step in the case where the bend data ANG does not indicate an outward bending, and proceeds to a tenth step in the case where the bend data AND indicates an outward bending (see (T8) in FIG. 3). For example, the operation proceeds to the ninth step when the bend sensor 124 supplies bend data ANG indicating that the information processor has been bent inward, and proceeds to the tenth step when the bend sensor 124 supplies bend data ANG indicating that the information processor has been bent outward.

In the ninth step, first processing is performed (see (T9) in FIG. 3).

In the tenth step, second processing that is different from the first processing is performed (see (T10) in FIG. 3).

The first processing and the second processing are different types of interrupt processing. In other words, the interrupt processing can be divided into the first processing and the second processing depending on the supplied bend data ANG.

For example, in the case where software for reading electronic books is used, the first processing may be a processing of putting a bookmark on the page being read by supplying an operation instruction input by one gesture, and the second processing may be a processing of fast-forwarding the pages of the electronic book by supplying an operation instruction input by one gesture. Note that details of the first processing and the second processing are described later.

In the eleventh step, the operation recovers from the interrupt processing (see (T11) in FIG. 3).

The information processor 100 described in this embodiment includes the arithmetic device 110 that receives an operation instruction INPUT supplied by the input unit 121 and bend data ANG supplied by the bend sensor 124. The arithmetic device 110 includes the storage unit 112 that stores a program. This structure enables the input unit 121 to be used in combination with the bend sensor 124 and thus can reduce complicated operations in which limited kinds of operations using only the input unit 121 are performed in a sequence. Consequently, a novel information processor that can be easily operated can be provided.

The arithmetic device 110 described as an example in this embodiment includes an input/output interface 115 and a transmission path 114 (see FIG. 1A).

The input/output interface 115 can supply data to the input/output device 120 and receive data supplied from the input/output device 120.

The transmission path 114 can supply data to the arithmetic unit 111, the storage unit 112, and the input/output interface 115. In addition, the arithmetic unit 111, the storage unit 112, and the input/output interface 115 can supply data to the transmission path 114.

The input/output device 120 includes the input unit 121. The input unit 121 can supply an operation instruction, a termination instruction, and the like.

Note that the termination instruction is an instruction to terminate the program.

Note that these units cannot be clearly distinguished and one unit also serves as another unit or include part of another unit in some cases. For example, a touch panel in which a display unit is overlapped with a touch sensor serves as the input unit 121 as well as the display unit 122.

Individual components included in the information processor 100 of one embodiment of the present invention are described below.

<<Input/Output Device>>

The input/output device 120 is connected to the transmission path 114 via the input/output interface 115. The input/output device 120 can supply external information to the information processor 100. The input/output device 120 can also supply information to the outside from the inside of the information processor 100.

<<Bend Sensor>>

The bend sensor 124 senses the angle θ at which information processor 100 is bent and supplies bend data ANG. Note that a state where the bend sensor 124 senses that the information processor 100 is bent at an angle smaller than a first threshold value θ1 can be defined as an inward bent state (see FIGS. 1B and 1C1), and a state where the bend sensor 124 senses that the information processor 100 is bent at an angle larger than a second threshold value θ2 can be defined as a outward bent state (see FIGS. 1B and 1C2).

For example, in the case where the bend position is determined in advance, the bend sensor 124 is provided at that position. In the case where there are a plurality of positions where the information processor can be bent, a plurality of sensors are arranged in a line or a matrix, so that coordinates of the bend position as well as the end angle θ can be identified.

For example, the bend sensor 124 can be provided along the periphery of the display unit 122. In the information processor 100 illustrated in FIG. 1B, the bend sensor 124 is provided along the longitudinal direction of the display unit 122. Alternatively, the bend sensor 124 may be provided along the lateral direction, for example.

Note that the bend sensor 124 that is provided to surround the display unit 122 can sense bend angles θ at bend positions in various (e.g., lateral, longitudinal, and diagonal) directions across the display unit 122. Thus, the display unit 122 can be bent at various positions and bend data ANG can be supplied.

The bend sensor 124 can be composed of, for example, a switch, a strain gauge, pressure-sensitive conductive rubber, a slip sensor, or the like.

Specifically, mechanical contact switches, magnetic switches, or the like that are opened and closed in accordance with the operations of opening and bending the display unit 122 may be arranged to surround the display unit 122.

Alternatively, a pair of stretch sensors may be provided on a surface of the display unit 122 on which images are displayed (also referred to as front surface) and the opposite surface (also referred to as rear surface) to form the bend sensor 124. When one of the stretch sensors senses expansion and the other senses contraction, it is found that the display unit 122 is bent outward such that the stretch sensor that has sensed the expansion is on the outer side.

Specifically, sheet-like or strip-like pressure-sensitive conductive rubber having a plurality of electrodes on the periphery of a region to be bent can be used as the stretch sensor. It is well known that deformation (stretching) of the sheet-like or strip-like pressure-sensitive conductive rubber having the plurality of electrodes on the periphery of the region to be bent can be sensed by electrical impedance tomography.

It is also possible to use a pair of strain gauges for the bend sensor 124.

<<Input Unit>>

As the input unit 121, any of various human interfaces and the like can be used. Specifically, a keyboard, a mouse, a touch sensor, a microphone, a camera, or the like can be used. In particular, supplying an operation instruction using a pointer is convenient because it enables intuitional operation.

For example, in the case where a touch panel is used as the input unit 121 that is overlapped with and integrally formed with the display unit, a user of the information processor 100 can input an operation instruction, a termination instruction, and the like by gestures (e.g., tap, drag, swipe, and pinch-in) using a finger as a pointer on the touch panel, <<Display Unit>>

The display unit 122 has flexibility and therefore can be bent. FIG. 1B illustrates the display unit 122 that is opened flat, and FIGS. 1C1 and 1C2 each illustrate the display unit 122 that is bent.

A specific structure of the flexible display unit 122 is described in detail in Embodiment 3.

<<Other Structures>>

As the input/output device 120, for example, a camera, a microphone, a read-only external memory, an external memory, a communication device, a scanner, a speaker, a printer, or the like can be used.

Specifically, examples of a camera include a digital camera and a digital video camera.

Examples of an external memory include a hard disk and a removable memory. Examples of a read-only external memory include a CD-ROM and a DVD-ROM.

Examples of a communication device include a network connection device and a modem.

The interrupt processing of the information processor described as an example in this embodiment will be described with reference to FIG. 4.

FIG. 4 is a flow chart showing the first processing that can be performed in the ninth step (see (T9) in FIG. 3) of the program to be executed by the arithmetic unit 111 of the information processor of one embodiment of the present invention.

In other words, FIG. 4 is a flow chart showing the first processing that can be performed in the case where the bend data supplied by the bend sensor 124 in the eighth step does not indicate an outward bending (i.e., indicates an inward bending).

The information processor 100 described as an example in this embodiment includes the storage unit 112 that stores the program that makes the arithmetic unit 111 execute the first processing described below.

<<Program>>

The first processing includes the following steps (see FIG. 4).

In a twelfth step, the input unit 121 receives a gesture (see (U12) in FIG. 4).

In a thirteenth step, the operation proceeds to a seventeenth step in the case where a first gesture or a second gesture has not been recognized in the twelfth step, and proceeds to a fourteenth step in the case where the first gesture or the second gesture has been recognized and an operation instruction INPUT has been supplied to the arithmetic device 110 in the twelfth step (see (U13) in FIG. 4).

For example, in the case where a touch sensor is used as the input unit 121, the user of the information processor 100 can give an operation instruction by a gesture using a finger as a pointer on the touch sensor.

Specifically, the first gesture can be a vertical swipe of sliding a finger on the touch sensor downward, and the second gesture can be a vertical swipe of sliding a finger on the touch sensor upward.

In the fourteenth step, the operation proceeds to a fifteenth step in the case where the second gesture has not been recognized in the twelfth step, and proceeds to a sixteenth step in the case where the second gesture has been recognized in the twelfth step (see (U14) in FIG. 4).

In this embodiment, the operation proceeds to the fifteenth step in the case where the first gesture has been recognized, and proceeds to the sixteenth step in the case where the second gesture has been recognized.

In the fifteenth step, first gesture processing is performed (see (U15) in FIG. 4). For example, in the case of software for reading electronic books, a processing of putting a bookmark on the page being read can be assigned to the first gesture processing.

In the sixteenth step, second gesture processing is performed (see (U16) in FIG. 4). For example, in the case of software for reading electronic books, a processing of removing a bookmark put on the page being read can be assigned to the second gesture processing.

In this manner, in the case where the bend data ANG supplied by the bend sensor 124 indicates an inward bending, different types of processing can be performed between when the first gesture has been recognized and when the second gesture has been recognized.

Thus, while the bend data ANG indicating an inward bending is supplied by the bend sensor 124, the user can make a vertical swipe gesture of sliding his/her finger downward (first gesture) or sliding his/her finger upward (second gesture) on the touch sensor used as the input unit 121 to put a bookmark on or remove a bookmark from the page being read.

In the seventeenth step, the operation recovers from the first processing (see (U17) in FIG. 4).

Note that although the operation using two gestures is described as an example in this embodiment, one embodiment of the present invention is not limited thereto. In the thirteenth step, three or more gestures may be recognized. For example, a vertical swipe of sliding two fingers on the touch sensor downward can be defined as a third gesture, and a vertical swipe of sliding two fingers on the touch sensor upward can be defined as a fourth gesture. Furthermore, a processing of selecting the next book can be assigned to third gesture processing, and a processing of selecting the previous book can be assigned to fourth gesture processing.

The interrupt processing of the information processor described as an example in this embodiment will be described with reference to FIG. 5.

FIG. 5 is a flow chart showing the second processing that can be performed in the tenth step (see (T10) in FIG. 3) of the program to be executed by the arithmetic unit 111 of the information processor of one embodiment of the present invention.

In other words, FIG. 5 is a flow chart showing the second processing that can be performed in the case where the bend data supplied by the bend sensor 124 in the eighth step indicates an outward bending.

The information processor 100 described as an example in this embodiment includes the storage unit 112 that stores the program that makes the arithmetic unit 111 execute the second processing described below.

<<Program>>

The second processing includes the following steps (see FIG. 5).

In an eighteenth step, the input unit 121 receives a gesture (see (V18) in FIG. 5).

In a nineteenth step, the operation proceeds to a twenty-third step in the case where a first gesture or a second gesture has not been recognized in the eighteenth step, and proceeds to a twentieth step in the case where the first gesture or the second gesture has been recognized and an operation instruction INPUT has been supplied to the arithmetic device 110 in the eighteenth step (see (V19) in FIG. 5).

For example, in the case where a touch sensor is used as the input unit 121, the user of the information processor 100 can give an operation instruction by a gesture using a finger as a pointer on the touch sensor.

Specifically, the first gesture can be a vertical swipe of sliding a finger on the touch sensor downward, and the second gesture can be a vertical swipe of sliding a finger on the touch sensor upward.

In the twentieth step, the operation proceeds to a twenty-first step in the case where the second gesture has not been recognized in the eighteenth step, and proceeds to a twenty-second step in the case where the second gesture has been recognized in the eighteenth step (see (V20) in FIG. 5).

In the twenty-first step, the first gesture processing is performed (see (V21) in FIG. 5). For example, in the case of software for reading electronic books, a processing of fast-forwarding (quickly turning forward) the pages can be assigned to the first gesture processing.

In the twenty-second step, second gesture processing is perforated (see (V22) in FIG. 5). For example, in the case of software for reading electronic books, a processing of fast-backwarding (quickly turning backward) the pages can be assigned to the second gesture processing.

In this manner, in the case where the bend data ANG supplied by the bend sensor 124 indicates an outward bending, different types of processing can be performed between when the first gesture has been recognized and when the second gesture has been recognized.

Thus, while the bend data ANG indicating an outward bending is supplied by the bend sensor 124, the user can make a vertical swipe gesture of sliding his/her finger downward (first gesture) or sliding his/her finger upward (second gesture) on the touch sensor used as the input unit 121 to fast-forward or fast-backward the pages of the electronic book.

In the twenty-third step, the operation recovers from the second processing (see (V23) in FIG. 5).

The information processor described in this embodiment performs different types of processing in accordance with the combination of bend data supplied by the bend sensor and an operation instruction supplied by the input unit that has recognized a gesture. This enables the input unit to be used in combination with the bend sensor and thus can reduce complicated operations in which limited kinds of operations using only the input unit are performed in a sequence. Consequently, a novel information processor that can be easily operated can be provided.

This embodiment can be combined with any of the other embodiments in this specification as appropriate.

(Embodiment 2)

In this embodiment, a structure of an information processor of one embodiment of the present invention will be described with reference to FIGS. 6A to 6C and FIGS. 7A, 7B1, 7B2, and 7C.

Figure 6A:
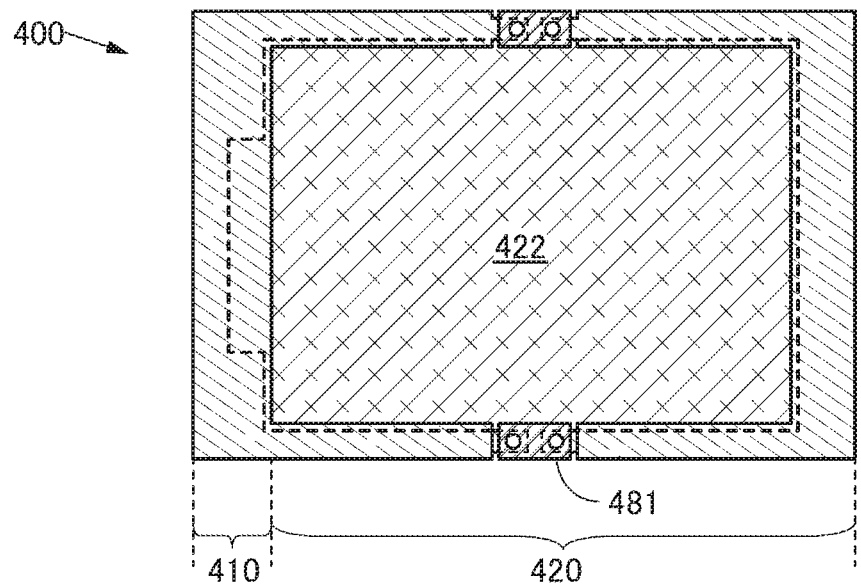
FIGS. 6A to 6C illustrate a structure of an information processor of one embodiment.
Figure 6B:
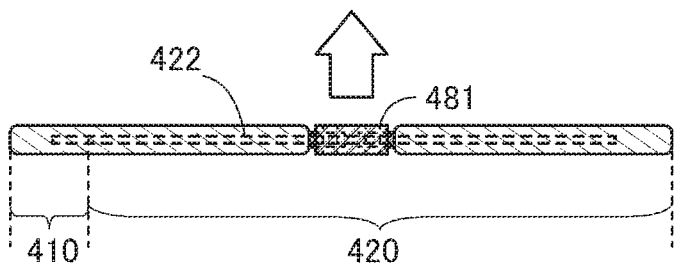

FIG. 6A is a plan view illustrating a structure of an information processor 400 of one embodiment of the present invention, and FIG. 6B is a side view illustrating the structure of the information processor 400. Note that the arrow in the drawing indicates the side where display is performed.

Figure 6C:
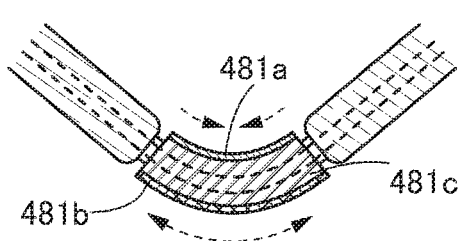

FIG. 6C is a side view illustrating a hinge 481 in FIG. 6B.

Figure 7A:
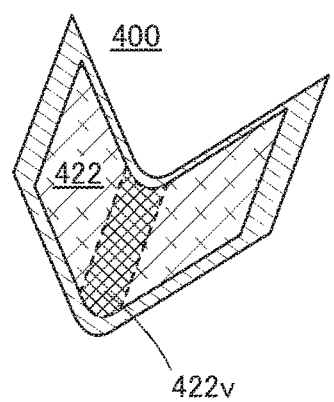
Figure 7A:
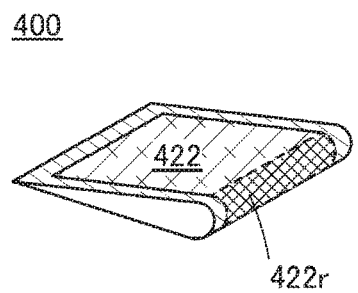
Figure 7A:
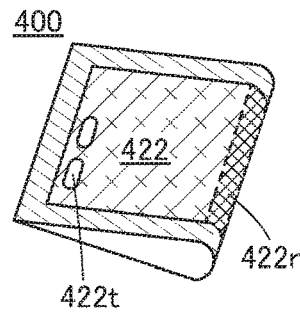

FIG. 7A illustrates how the information processor 400 that is bent inward is used, and FIGS. 7B1, 7B2, and 7C each illustrate how the information processor 400 that is bent outward is used.

<Plan View>

The information processor 400 includes an arithmetic device 410 that receives bend data ANG and an operation instruction INPUT and supplies image data VIDEO. The information processor 400 also includes an input/output device 420 that receives image data VIDEO and supplies bend data ANG and an operation instruction INPUT (see FIG. 6A).

The information processor 400 is provided with a touch panel 422 serving as both a display unit that receives image data VIDEO and an input unit that senses a touch of a user's finger and supplies an operation instruction INPUT.

The touch panel 422 has flexibility and therefore can be bent.

The touch panel 422 is supported so that a user can bend it. Specifically, the touch panel 422 is supported by a frame that is composed of two U-shaped members connected to the hinges 481. Bending the hinges 481 allows the touch panel 422 to be bent. The hinge 481 is provided on each of two opposite sides of the touch panel 422.

The hinges 481 may be placed to allow the touch panel 422 to be bent at two or more positions. Different bend data ANG may be supplied depending on the bend position of the touch panel 422. Thus, it is possible to make the arithmetic device 410 execute different types of processing depending on the bend position.

<Side View>

The touch panel 422 is positioned roughly at the center when seen from the side of the information processor 400 (see FIG. 6B).

A spindle, an elastic body, or the like can be used for the hinge 481.

The hinge 481 includes a thick elastic body 481c between a pair of stretch sensors 481a and 481b (see FIG. 6C). When the hinge 481 is bent, one of the pair of stretch sensors supplies a signal indicating that expansion has been sensed, and the other supplies a signal indicating that contraction has been sensed. On the basis of comparison of these signals, bend data ANG indicating an outward bending or an inward bending can be supplied.

Note that the hinge 481 may be provided with a ratchet mechanism, a unit to prevent slipping, or the like so that the bend angle can be adjusted as appropriate.

<Drawings Illustrating How the Information Processor is Used>

FIG. 7A illustrates how the information processor 400 that is bent inward is used, and FIGS. 7B1, 7B2, and 7C each illustrate how the information processor 400 that is bent outward is used.

When the information processor 400 is bent inward, the touch panel 422 has a bottom portion 422v (see FIG. 7A). The bottom portion 422v is at a depression between other portions of the touch panel 422. Thus, a user can make a gesture of moving his/her finger along the bottom portion 422v accurately. Specifically, the first gesture can be a vertical swipe of sliding a finger on the bottom portion 422v downward, and the second gesture can be a vertical swipe of sliding a finger on the bottom portion 422v upward.

The bottom portion 422 v is less likely to be touched unintentionally by a user; accordingly, incorrect operation can be prevented. For example, an operation that has a high risk of giving disadvantage to the user, such as file deletion or forced termination, can be assigned to the gesture using the bottom portion 422v.

When the information processor 400 bent outward, the touch panel 422 has a ridgeline portion 422r (see FIG. 7B1).The ridgeline portion 422r is projected from other portions of the touch panel 422. Thus, a user can make a gesture of moving his/her finger along the ridgeline portion 422r accurately.

The ridgeline portion 422r is likely to be touched unintentionally by a user to cause incorrect operation. To prevent that, the information processor 400 may be provided with a function that allows the user to switch between a state where a gesture using the ridgeline portion 422r can be recognized and a state where the gesture cannot be recognized. For example, it is possible to make a gesture using the ridgeline portion 422r be recognized only when the user is touching a selection button region 422t on the touch panel 422 (see FIG. 7B2).

Moreover, different types of processing can be assigned to a first gesture that is made on one of two regions into which the touch panel 422 is divided at the ridgeline portion 422r and a first gesture that is made on the other region.

Figure 7C:
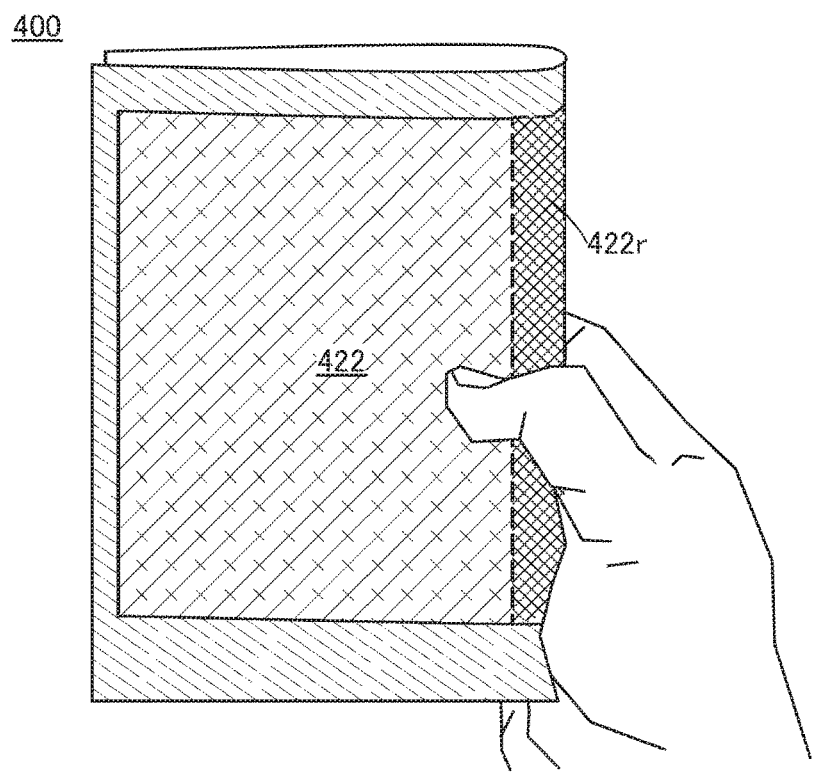

For example, the information processor 400 shown in FIG. 7C is held between the thumb at the front in the drawing and another finger touching the touch panel 422. When the touch panel 422 is divided at the ridgeline portion 422r, in a region on the front side, which is touched by the thumb, a vertical swipe can be assigned to a processing of zooming in or out a displayed image. In a region on the opposite side, which is touched by another finger that is not shown, a vertical swipe can be assigned to a processing of quickly turning the pages.

Alternatively, the front region may be used mainly for displaying an image or the like the opposite region may be used mainly for operation.

Furthermore, the arithmetic device 410 that has received the bend data ANG indicating an outward bending or an inward bending can display an image or the like used for operation of the information processor 400 on the bottom portion 422v or the ridgeline portion 422r of the touch panel 422.

This embodiment can be combined with any of the other embodiments in this specification as appropriate.

(Embodiment 3)

In this embodiment, a structure of an input/output device that can be used for the information processor of one embodiment of the present invention will be described with reference to FIGS. 8A to 8C.

Figure 8A:
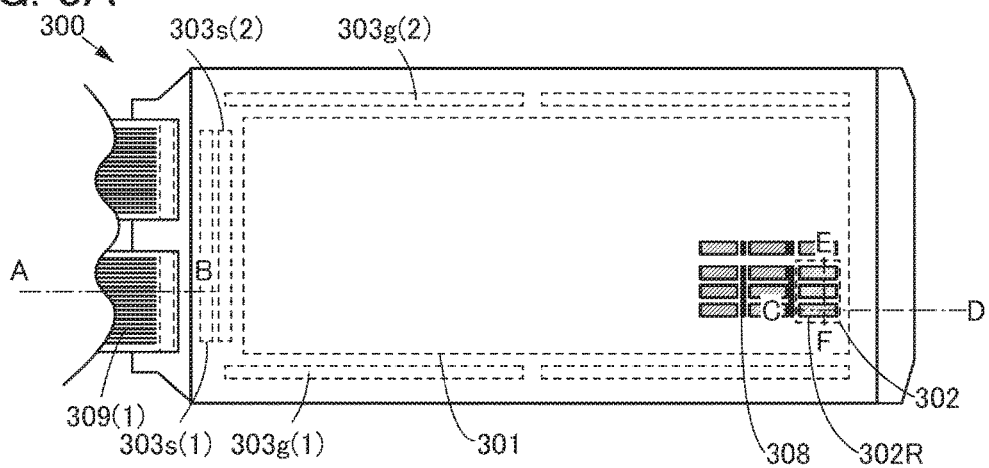
FIGS. 8A to 8C illustrate a structure of an input/output device that can be used for an information processor of one embodiment.

FIG. 8A is a plan view illustrating the structure of an input/output device that can be used in the information processor of one embodiment of the present invention.

Figure 8B:
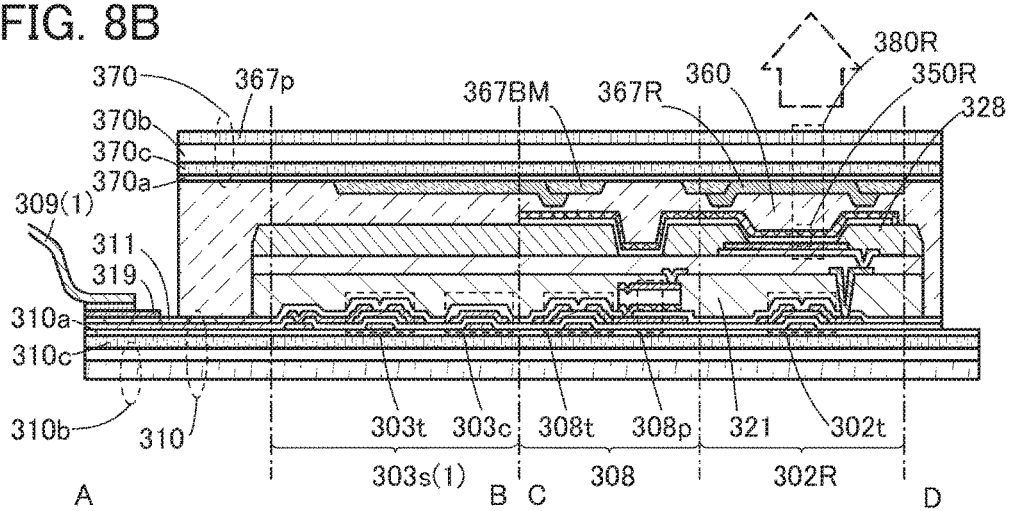

FIG. 8B is a cross-sectional view taken along line A-B and line C-D in FIG. 8A.

Figure 8C:
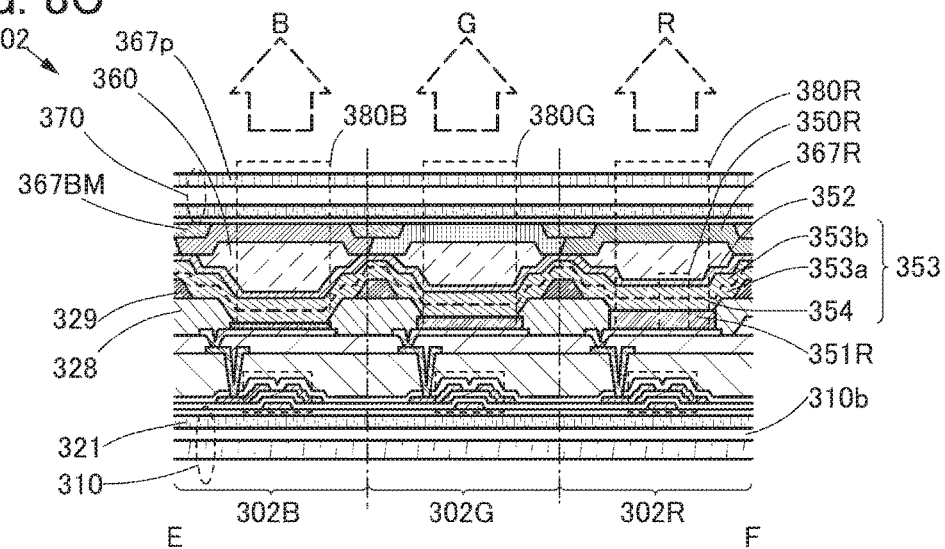

FIG. 8C is a cross-sectional view taken along line E-F in FIG. 8A.

<Plan View>

An input/output device 300 described as an example in this embodiment includes a display portion 301 (see FIG. 8A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the input/output device 300 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The input/output device 300 is provided with an imaging pixel driver circuit 303g(2) that can supply control signals to the imaging pixels 308 and an imaging signal line driver circuit 303s(2) that reads out imaging signals.

<Cross-Sectional View>

The input/output device 300 includes a substrate 310 and a counter substrate 370 that faces the substrate 310 (see FIG. 8B).

The substrate 310 is a stacked body in which a flexible substrate 310b, a barrier film 310a that prevents diffusion of unintentional impurities to the light-emitting elements, and an adhesive layer 310c that attaches the barrier film 310a to the substrate 310b are stacked.

The counter substrate 370 is a stacked body including a flexible substrate 370b, a barrier film 370a that prevents diffusion of unintentional impurities to the light-emitting elements, and an adhesive layer 370c that attaches the barrier film 370a to the substrate 370b (see FIG. 8B).

A sealant 360 attaches the counter substrate 370 to the substrate 310. The sealant 360, also serving as an optical adhesive layer, has a refractive index higher than that of air. The pixel circuits and the light-emitting elements (e.g., a first light-emitting element 350R) are provided between the substrate 310 and the counter substrate 370.

<<Structure of Pixel>>

Each of the pixels 302 includes the sub-pixel 302R, a sub-pixel 302G, and a sub-pixel 302B (see FIG. 8C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 8B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 8C).

The layer 353 containing a light-emitting organic compound, includes a light-emitting unit 353a, a light-emitting unit 353b, and an intermediate layer 354 between the light-emitting units 353a find 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that is in contact with the first light-emitting element 330R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 8B and 8C.

<<Structure of Display Panel>>

The input/output device 300 includes a light-blocking layer 367BM on the counter substrate 370. The light-blocking layer 367BM is provided so as to surround the colouring layer (e.g., the first coloring layer 367R).

The input/output device 300 includes an anti-reflective layer 367p positioned in a region overlapping with the display portion 301 As the anti-reflective layer 367p, a circular polarizing plate can be used, for example.

The input/output device 300 includes an insulating film 321. The insulating film 321 covets the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The input/output device 300 includes the light-emitting elements (e.g., the first light-emitting element 350R) over the insulating film 321.

The input/output device 300 includes, over the insulating film 321, a partition wall 328 that overlaps with an end portion of the first lower electrode 351R (see FIG. 8C). In addition, a spacer 329 that controls the distance between the substrate 310 and the counter substrate 370 is provided on the partition wall 328.

<<Structure of Image Signal Line Driver Circuit>>

The image signal line driver circuit 303s(1) includes a transistor 303t and a capacitor 303c. Note that the driver circuit can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Structures>>

The input/output device 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319.

Note that a printed wiring board (PWB) may be attached to the FPC 309(1).

This embodiment can be combined with any of the other embodiments in this specification as appropriate.

(Embodiment 4)

In this embodiment, a structure of a bendable touch panel in which a touch sensor (a contact detection device) as an input unit is provided to overlap with a display portion will be described with reference to FIGS. 9A and 9B and FIG. 10.

Figure 9A:
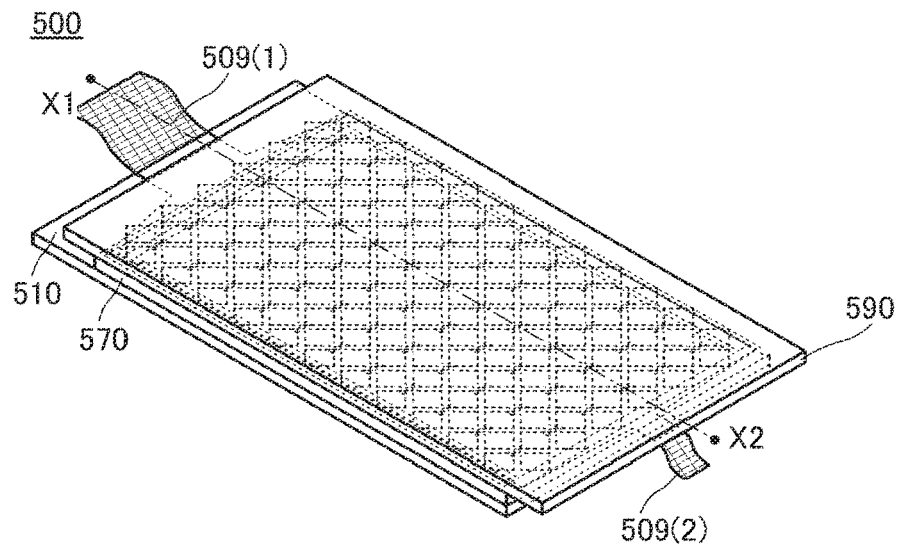
FIGS. 9A and 9B illustrate a structure of an input/output device that can be used for an information processor of one embodiment.

FIG. 9A is a schematic perspective view of a touch panel 500 described as an example in this embodiment. Note that FIGS. 9A and 9B illustrate only main components for simplicity. FIG. 9B is a developed view of the schematic perspective view of the touch panel 500.

Figure 10:
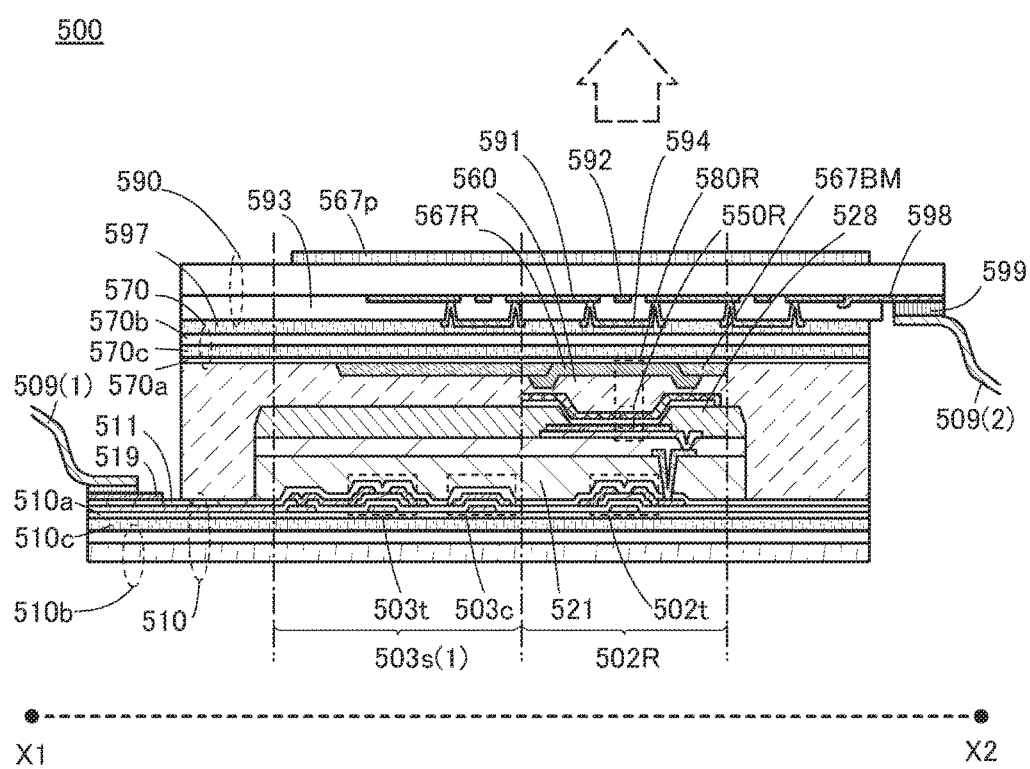
FIG. 10 illustrates a structure of an input/output device that can be used for an information processor of one embodiment.

FIG. 10 is a cross-sectional view of the touch panel 500 taken along line X1-X2 in FIG. 9A.

Figure 9B:
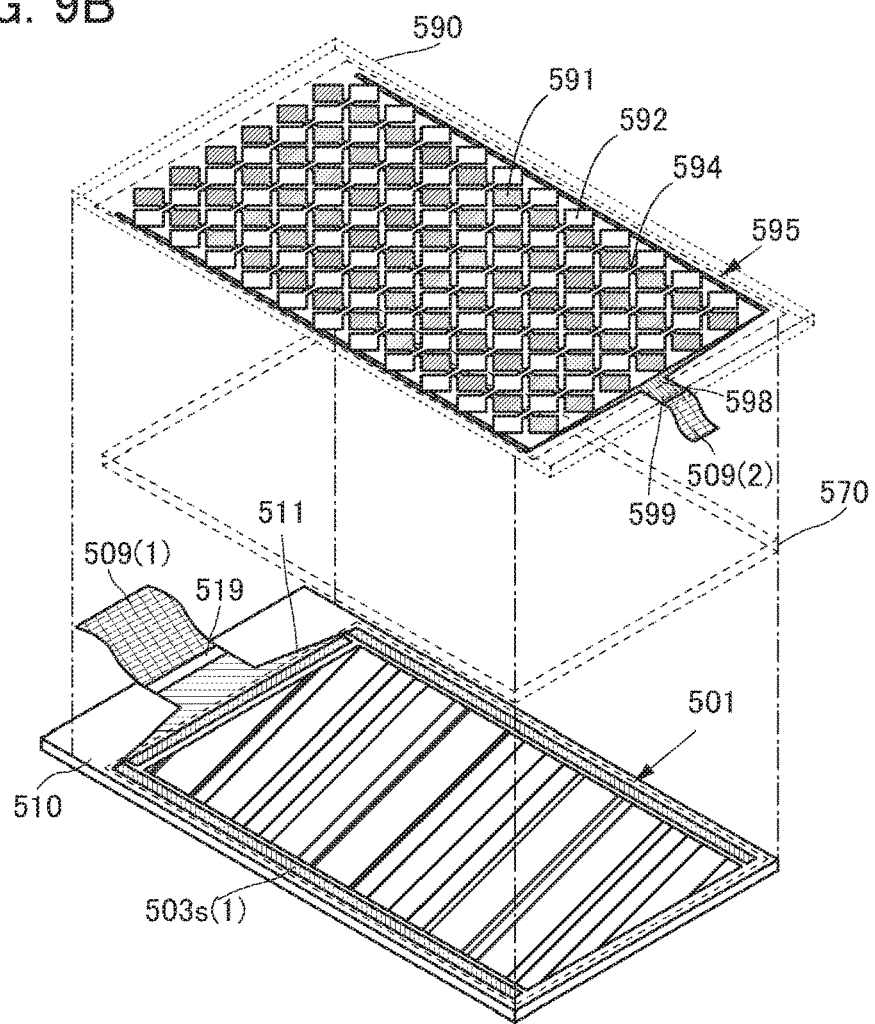

The touch panel 500 includes a display portion 501 and a touch sensor 595 (see FIG. 9B). Furthermore, the touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal for electrical connection to an FPC 590(2). Note that in FIG. 9B, electrodes, wirings, and the like of the touch sensor 595 provided on the back side of the substrate 590 (the side opposite to the viewer side) are indicated by solid lines for clarity.

A capacitive touch sensor is preferably used. Examples of the capacitive touch sensor are a surface capacitive touch sensor and a projected capacitive touch sensor. Examples of the projected capacitive touch sensor are a self capacitive touch sensor and a mutual capacitive touch sensor, which differ mainly in the driving method. The use of a mutual capacitive touch sensor is preferable because multiple points can be sensed simultaneously.

An example of using a projected capacitive touch sensor is described below with reference to FIG. 9B. Note that a variety of sensors that can sense the closeness or the contact of a sensing target such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrode 592 is in the form of a series of quadrangles arranged in one direction as illustrated in FIGS. 9A and 9B. Each of the electrodes 591 is in the form of a quadrangle. A wiring 594 electrically connects two electrodes 591 arranged in a direction intersecting with the direction in which the electrode 592 extends. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 md the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The structure of the touch sensor 595 shown in FIGS. 9A and 9B is described with reference to FIG. 10.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used.

The electrodes 591 and the electrodes 592 may be formed by depositing a light-transmitting conductive material on the substrate 590 by a sputtering method and then removing an unnecessary portion by a known patterning technique such as photolithography.

The insulating layer 593 covers the electrodes 591 and the electrodes 592. Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. The wiring 594 is preferably formed using a light-transmitting conductive material, in which case the aperture ratio of the touch panel can be increased. Moreover, the wiring 594 is preferably formed using a material that has higher conductivity than those of the electrodes 591 and the electrodes 592.

One electrode 592 extends in one direction, and a plurality of electrodes 592 is provided in the form of stripes.

The wiring 594 intersects with the electrode 592.

Adjacent electrodes 591 are provided with one electrode 592 provided therebetween and are electrically connected by the wiring 594.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, a known anisotropic conductive film (ACF), a known anisotropic conductive paste (ACP), or the like can be used.

The adhesive layer 597 has a light-transmitting property. For example, a thermosetting resin or an ultraviolet curable resin can be used; specifically, a resin such as acrylic, urethane, epoxy resin, or a resin having a siloxane bond can be used.

<Display Portion>

The display portion 501 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

Other than organic electroluminescent elements, for example, any of various display elements such as display elements (electronic ink) that perform display by an electrophoretic method, an electronic liquid powder method, or the like; MEMS shutter display elements; and optical-interference-type MEMS display elements can be used. Note that a pixel circuit structure suitable tor display elements to be used can be selected from known pixel circuit structures.

The substrate 510 is a stacked body in which a flexible substrate 510b, a barrier film 510a that prevents diffusion of unintentional impurities to light-emitting elements, and an adhesive layer 510c that attaches the barrier film 510a to the substrate 510b are stacked.

The substrate 570 is a stacked body in which a flexible substrate 570b, a barrier film 570a that prevents diffusion of unintentional impurities to the light-emitting elements, and an adhesive layer 570c that attaches the barrier film 570a to the substrate 570b are stacked.

A sealant 560 attaches the substrate 570 to the substrate 510. The sealant 560, also serving as an optical adhesive layer, has a refractive index higher than that of air. The pixel circuits and the light-emitting elements (e.g., a first light-emitting element 550R) are provided between the substrate 510 and the substrate 570.

<<Structure of Pixel>>

A pixel includes a sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. Furthermore, the light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the counter substrate 570. The coloring layer transmits light of a particular wavelength and is, for example, a layer that selectively transmits light of red, green, or blue color. A region that transmits light emitted from the light-emitting element as it is may be provided as well.

The light-emitting module 580R includes the sealant 560 that is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the sealant 560 that also serves as an optical adhesive layer and through the first coloring layer 567R and is emitted to the outside of the light-emitting module 580R as indicated by an arrow in FIG. 10.

<<Structure of Display Portion>>

The display portion 501 includes a light-blocking layer 567BM on the counter substrate 570. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. An insulating film on which a layer that can prevent diffusion of impurities to the transistor 502t and the like is stacked can be used as the insulating film 521.

The display portion 501 includes the light-emitting elements (e.g., the first light-emitting element 550R) over the insulating film 521.

The display portion 501 includes, over the insulating film 521, a partition wall 528 that overlaps with an end portion of the lower electrode. In addition, a spacer that controls the distance between the substrate 510 and the substrate 570 is provided on the partition wall 528.

<<Structure of Image Signal Line Driver Circuit>>

The image signal line driver circuit 503s(1) includes a transistor 503t and a capacitor 503c. Note that the driver circuit can be formed in the same process and over the same substrate as those of the pixel circuits.

<<Other Structures>>

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

This embodiment can be combined with any of the other embodiments in this specification as appropriate.

This application is based on Japanese Patent Application serial no. 2013-130247 filed with Japan Patent Office on Jun. 21, 2013, the entire contents of which are hereby incorporated by reference.

What is claimed is:

1. An information processor comprising:
a touch panel including a selection button region,
wherein the touch panel is configured to be bent outward to form a ridgeline portion in the touch panel, and
wherein a gesture received within the ridgeline portion is only recognized when the selection button region is touched.

2. The information processor according to claim 1,
wherein the information processor is configured to be bend inward to form a bottom portion in the touch panel, and
wherein the bottom portion is configured to be assigned to a gesture of file deletion.

3. The information processor according to claim 1,
wherein the information processor is configured to be bend inward to form a bottom portion in the touch panel, and
wherein the bottom portion is configured to be assigned to a gesture of forced termination.

4. An information processor comprising:
a touch panel including a selection button region,
wherein the touch panel is configured to be bent outward to form a ridgeline portion in the touch panel,
wherein a first gesture received within the ridgeline portion is only recognized only when the selection button region is touched,
wherein the touch panel is divided into a first region and a second region by the ridgeline portion, and
wherein a second gesture is configured to be assigned to first processing in the first region and second processing in the second region, the second processing is different from the first processing.

5. The information processor according to claim 4,
wherein the information processor is configured to be bend inward to form a bottom portion in the touch panel, and
wherein the bottom portion is configured to be assigned to a gesture of file deletion.

6. The information processor according to claim 4,
wherein the information processor is configured to be bend inward to form a bottom portion in the touch panel, and
wherein the bottom portion is configured to be assigned to a gesture of forced termination.

7. The information processor according to claim 4,
wherein the first processing is zooming in or out a displayed image and the second processing is quickly turning pages.

* * * * *